United States Patent
Barnes

(10) Patent No.: US 11,112,009 B2
(45) Date of Patent: Sep. 7, 2021

(54) LOW HEAT TRANSFER PISTON VIA BINDER JET TECHNOLOGY

(71) Applicant: CUMMINS INC., Columbus, IN (US)

(72) Inventor: David M. Barnes, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/839,626

(22) Filed: Apr. 3, 2020

(65) Prior Publication Data

US 2020/0325988 A1    Oct. 15, 2020

Related U.S. Application Data

(60) Provisional application No. 62/832,048, filed on Apr. 10, 2019.

(51) Int. Cl.
| | | |
|---|---|---|
| F02F 3/26 | (2006.01) | |
| F16J 1/00 | (2006.01) | |
| B23P 15/10 | (2006.01) | |
| B33Y 10/00 | (2015.01) | |
| B33Y 80/00 | (2015.01) | |
| B22F 10/20 | (2021.01) | |

(52) U.S. Cl.
CPC .............. *F16J 1/008* (2013.01); *B23P 15/10* (2013.01); *B22F 10/20* (2021.01); *B33Y 10/00* (2014.12); *B33Y 80/00* (2014.12)

(58) Field of Classification Search
CPC ........... F16J 1/008; B23P 15/10; B33Y 10/00; B33Y 80/00; B22F 3/1055

USPC ......... 123/193.4, 193.6; 29/888.04, 888.042, 29/888.043

See application file for complete search history.

(56) References Cited

U.S. PATENT DOCUMENTS

| | | | |
|---|---|---|---|
| 7,654,240 B2 | 2/2010 | Jarrett et al. | |
| 8,171,842 B2 * | 5/2012 | Walker | B23P 15/10 92/218 |
| 8,584,626 B2 | 11/2013 | Jacobi | |
| 8,800,144 B2 * | 8/2014 | Walker | B23P 15/10 29/888.042 |
| 9,726,109 B2 | 8/2017 | Boczek | |
| 9,765,727 B2 | 9/2017 | Evers et al. | |
| 2014/0299091 A1 | 10/2014 | Ribeiro et al. | |
| 2017/0363040 A1 | 12/2017 | Brown et al. | |
| 2020/0088129 A1 * | 3/2020 | Fregni | F02B 23/06 |
| 2020/0340424 A1 * | 10/2020 | Kelleher | B33Y 80/00 |

FOREIGN PATENT DOCUMENTS

| | | | |
|---|---|---|---|
| WO | WO-2014/165734 | 10/2014 | |
| WO | WO-2016/126455 | 8/2016 | |
| WO | WO-2016/201241 | 12/2016 | |
| WO | WO-2018/069411 | 4/2018 | |
| WO | WO 2019143403 | * 7/2019 | F02F 3/16 |

* cited by examiner

Primary Examiner — Hai H Huynh
(74) Attorney, Agent, or Firm — Foley & Lardner LLP

(57) ABSTRACT

A piston for an internal combustion engine includes a skirt and a crown coupled to the skirt. The crown is produced in isolation from the skirt using an additive manufacturing process. The piston includes a first air gap between the crown and the skirt. According to an example embodiment, the crown includes a plurality of sections produced in isolation from the skirt. The crown may include a second air gap disposed between two of the plurality of sections.

18 Claims, 8 Drawing Sheets

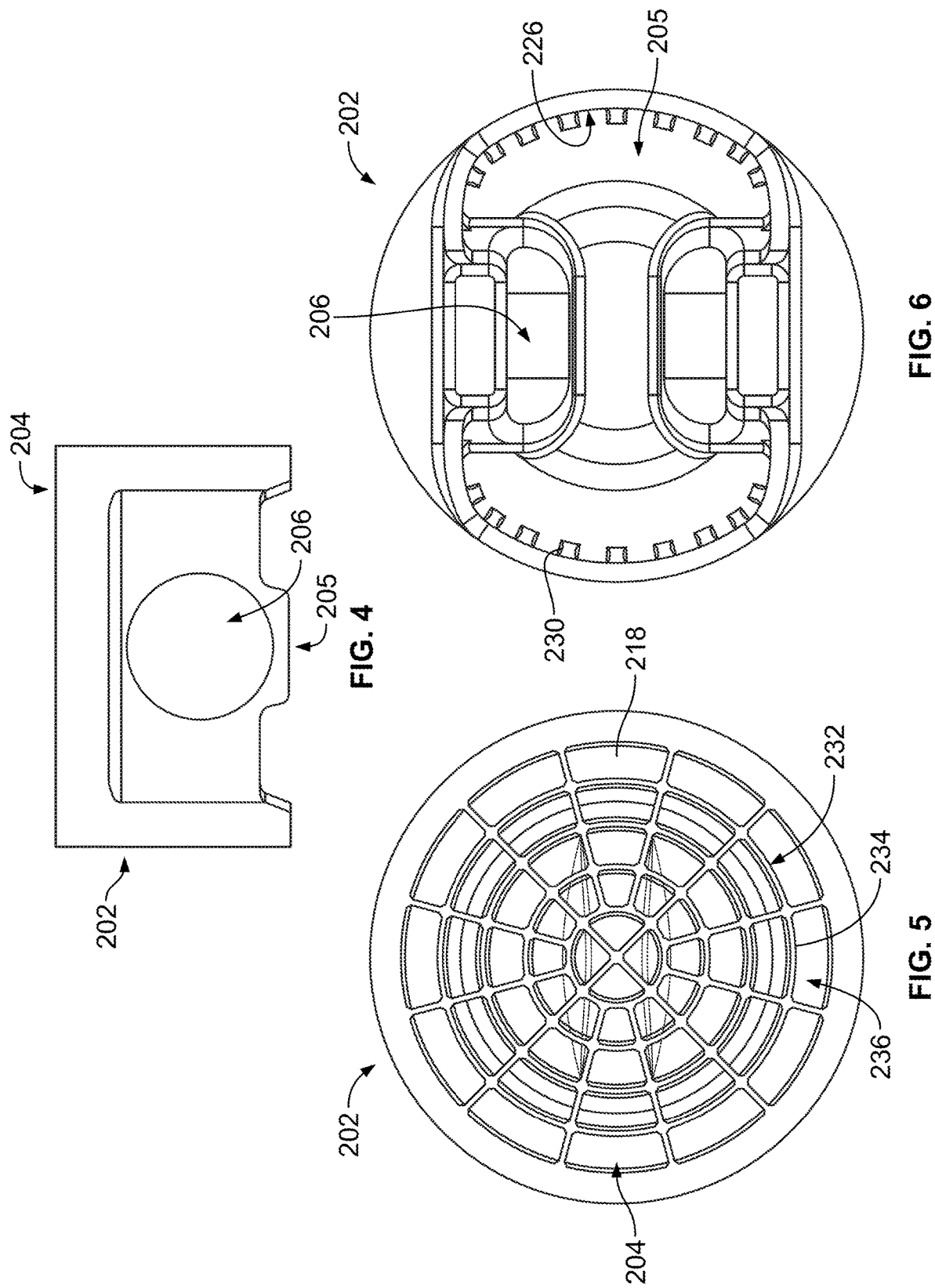

LOW HEAT TRANSFER PISTON VIA BINDER JET TECHNOLOGY

CROSS-REFERENCE TO RELATED PATENT APPLICATIONS

The present application claims the benefit of and priority to U.S. Provisional Application No. 62/832,048, entitled "Low Heat Transfer Piston via Binder Jet Technology" and filed Apr. 10, 2019, the entire disclosure of which is hereby incorporated by reference herein.

TECHNICAL FIELD

The present application relates generally to pistons for internal combustion engine systems.

BACKGROUND

It is generally desirable to minimize heat transfer losses from the combustion chamber of internal combustion engine systems. A primary source of heat loss from the combustion chamber is through the piston. In order to reduce heat transfer losses, the piston may include an air gap to insulate the combustion chamber. For example, the piston may include an air gap between the piston crown and piston skirt in order to increase the overall heat transfer resistance between the combustion chamber and the crankcase.

Air gaps within the piston may be formed using an additive manufacturing method dealing with powder metal. There are many types of additive manufacturing processes. In one process, Direct Energy Deposition (DED), the piston is built up in small layers by applying a laser beam to a carefully positioned stream of metal powder. In another process, Selective Laser Melting (SLM), the laser beam is directed onto new layers applied on top of a bed of metal powder. These processes allow the geometry of the piston to be accurately controlled. Such manufacturing methods may also be used to form enclosed air gaps within the piston. However, there are many factors that may prohibit the use of these processes in large scale production. For instance, the rate of production that can be achieved using such methods is very small, and residual stresses must be managed as a result of using a laser to heat and melt the metal powder.

The binder jetting (or binder jet) additive manufacturing process presents viable solutions to the above noted challenges. Binder jetting deposits droplets of binder within a metal powder bed, rather than selectively laser sintering individual powders together. The result is a process which may boast a speed 50+ times faster than SLM. This speed is further increased in post processing the printed piece, as SLM may require support structure removal, and the binder jetting process does not require supports for printing. Moreover, residual stresses are no longer printed into the part by lasers. A differentiating feature within the binder jet process features a "green-state" of the part. The green-state results once the process has finished binding powder which will form the end product. To achieve the desired metallic properties, the green-state piece is then placed into a sintering oven (batch or continuous) to remove the binder and sinter the metal powder all in one step.

SUMMARY

In one set of embodiments, a piston includes a skirt and a crown. The crown is coupled to the skirt. The crown is produced in isolation from the skirt using an additive manufacturing process. The piston includes a first air gap between the crown and the skirt.

In another set of embodiments, an internal combustion engine includes a cylinder block, a cylinder head, and a piston. The cylinder head is coupled to an upper end of the cylinder block and covers a cavity defined by the cylinder block. The piston is at least partially disposed within the cavity defined by the cylinder block. The piston includes a skirt and a crown. The crown is coupled the skirt. The crown is produced in isolation from the skirt using an additive manufacturing process. The piston includes a first air gap between the crown and the skirt In yet another set of embodiments, a method of manufacturing a piston of an internal combustion engine includes forming a skirt using an additive manufacturing process and forming a crown in isolation from the skirt using the additive manufacturing process. At least one of the skirt or the crown includes a recessed area. The method further includes positioning the crown onto the skirt such that the recessed area is disposed therebetween and joining the crown to the skirt.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

FIG. 4 is a side view of a skirt of the piston of FIG. 2;

FIG. 5 is a top view of the skirt of FIG. 4;

FIG. 6 is a bottom view of the skirt of FIG. 4;

Figure 1:
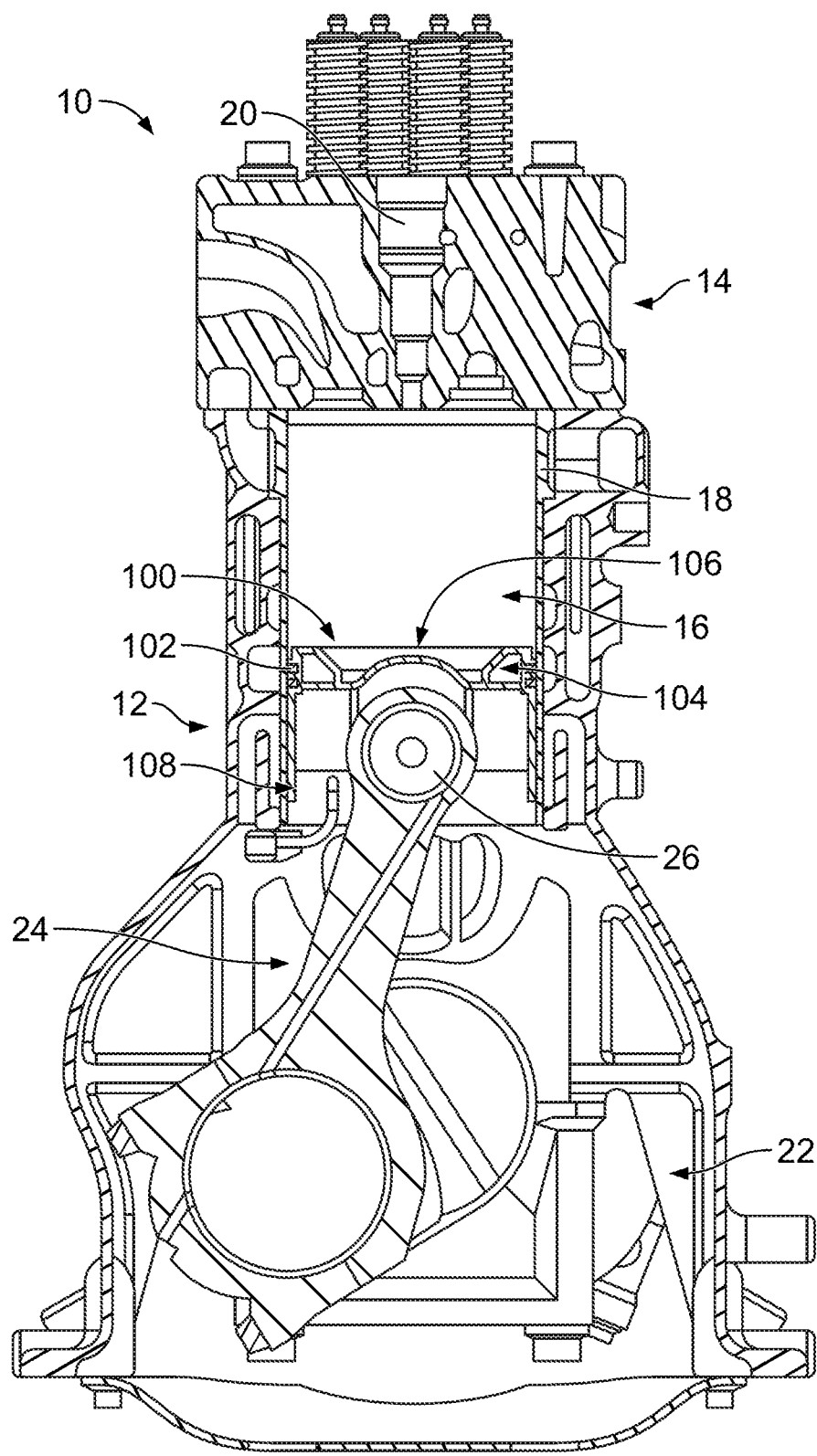
FIG. 1 is a sectional view of an example internal combustion engine system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for manufacturing a piston of an internal combustion engine system. The various concepts introduced above and discussed in greater detail below may be implemented in any of numerous ways, as the described concepts are not limited to any particular manner of implementation. Examples of specific implementations and applications are provided primarily for illustrative purposes.

I. OVERVIEW

An internal combustion engine system includes multiple (e.g., six, eight, etc.) pistons which move within the engine in response to forces generated during the combustion process. The pistons may separate a combustion chamber of the engine from a crankcase, which is at least partially filled with oil to cool the various engine components. A portion of the heat generated during the combustion process is transferred through the piston to the oil. The heat transfer losses from the combustion chamber reduce the overall fuel efficiency (e.g., economy) of the engine.

In order to reduce heat transfer losses from the combustion chamber, some pistons include an air gap and/or pocket, which functions to insulate the combustion chamber. The air gap is traditionally formed between a piston crown and a piston skirt, for example when welding the crown to the skirt during the manufacturing process. Alternatively, the air gap may be formed directly into the crown using an additive manufacturing process with a minimal number of secondary processes. In additive manufacturing processes, the piston is built up in individual layers. Material for each layer is deposited using either a nozzle that ejects a spray of metal powder, such as in DED, or a via a recoater blade such as in the powder bed processes of binder jetting and SLM. In processes similar to DED and SLM, metal powder is melted onto previously formed layers using a high-powered laser in order to form a desired structure. In some processes, such as selective laser sintering, a support structure is required upon which the first layers may be deposited. However, the cost associated with operating the laser may be high. Moreover, such processes require significant manufacturing time, especially when compared with other additive manufacturing techniques such as binder jetting.

Implementations herein relate to a piston including a crown that is manufactured in one or more sections using a binder jet manufacturing process. Each one of the sections is produced in isolation (e.g., separately, individually, etc.) from the remaining sections. An isogrid is formed onto each of the sections during the manufacturing process. The sections are cleaned in a green-state (prior to a sintering operation), individually, to remove excess material from the sections and the isogrid. The sections are then sintered together such that a plurality of air pockets are formed at the intersection between the voids in the crown sections and/or at least one crown section and the skirt. Together, the air pockets form an air gap between the crown sections and/or between at least one crown section and the skirt. Among other benefits, incorporating a plurality of air pockets within the crown significantly reduces the weight of the piston. The air pockets also increase the heat transfer resistance through the piston. By manufacturing the piston in sections, air pockets may be formed using binder jet technology. Moreover, the sectioned manufacturing approach allows for the production of multiple sections simultaneously, which significantly reduces manufacturing time. In other implementations, processes such as selective laser melt (SLM) or direct energy deposit (DED) may be used.

In one set of embodiments, a piston includes a skirt and a crown. The crown is coupled to an upper portion of the skirt. The crown is produced in isolation from the skirt using an additive manufacturing process. The piston includes at least one air gap between the crown and the skirt. In some embodiments, the additive manufacturing process includes a binder jet manufacturing process. In other embodiments, processes such as selective laser melt (SLM) or direct energy deposit (DED) may be used.

In another set of embodiments, an internal combustion engine includes a cylinder block, a cylinder head, and a piston. The cylinder head is coupled to an upper end of the cylinder block. The piston is at least partially disposed within a cavity defined by the cylinder block. The piston includes a skirt and a crown. The crown is coupled to an upper portion of the skirt. The crown is produced in isolation from the skirt using an additive manufacturing process. The piston includes at least one air gap between the crown and the skirt.

In yet another set of embodiments, a method of manufacturing a piston of an internal combustion engine includes forming a skirt using an additive manufacturing process, forming a crown in isolation from the skirt using the additive manufacturing process. At least one of the skirt or the crown includes a plurality of ribs defining a plurality of recessed areas. The method additionally includes cleaning the skirt and the crown. The method further includes positioning the crown onto the skirt and joining the crown to the skirt.

I. EXAMPLE PISTON

FIG. 1 is a sectional view of an internal combustion engine system, shown as engine 10. The engine 10 is utilized to power a vehicle (e.g., a powertrain, etc.). The vehicle may be a commercial on-road vehicle such as a semi-truck, or a medium or light duty vehicle (e.g., a school bus, a pickup truck, etc.), or the like. In some example embodiments, the vehicle may be an off-road vehicle such as a construction vehicle (e.g., a loader, a crane, a portable air compressor, etc.). The engine 10 may be a diesel internal combustion engine that uses diesel fuel to drive the combustion process. Alternatively, the engine 10 may be a bi-fuel internal combustion engine system, a gasoline internal combustion engine system, a liquid nature gas internal combustion engine system, a compressed natural gas internal combustion engine system, a biofuel internal combustion engine system, an ethanol internal combustion engine system, or an another internal combustion engine system using a different type of fuel source.

As shown in FIG. 1, the engine 10 includes a cylinder block 12 and a cylinder head 14. The cylinder block 12 defines a combustion cavity, shown as cavity 16. The cavity 16 is generally cylindrically-shaped and is configured to receive a piston 100 therein. In other words, the piston 100 is at least partially disposed within the cavity 16. The engine 10 additionally includes a liner 18 positioned within the cylinder in between the piston 100 and the cylinder block 12. The liner 18 is sized and shaped to nestably mate with the cavity 16. Accordingly, the liner 18 includes a generally cylindrically-shaped tube with an exterior surface that substantially matches an interior surface of the cavity 16.

The piston 100 is disposed within the liner 18. As shown in FIG. 1, the piston 100 is slidably engaged with the liner 18 such that the piston 100 is free to reciprocate within the liner 18. An exterior surface of the piston 100 is sized to substantially match (e.g., be slightly less than an interference with) the interior surface of the liner 18. The piston 100 includes a plurality of piston rings 102, which engage with the liner 18 to seal the combustion chamber from any leakage during the combustion process. In the example embodiment of FIG. 1, the piston 100 includes an oil gallery 104 through which oil may flow to cool the piston 100. The oil gallery 104 extends circumferentially along a perimeter of the piston 100. The oil gallery 104 is defined by a crown 106 of the piston 100 forming an upper portion of the piston 100, and a skirt 108 of the piston 100, which extends axially away (e.g., vertically downward as shown in FIG. 1) from the crown 106.

The cylinder head 14 is disposed on an upper end of the cylinder block 12 and closes off a first end the cavity 16. The cylinder head 14 is coupled to the cylinder block 12. The cylinder block 12 includes a fuel injector 20 aligned with the cavity 16. The fuel injector 20 is configured to spray (e.g., inject, distribute, etc.) fuel within the cavity 16, between the cylinder head 14 and the piston 100. Movement of the piston 100 within the cavity 16 (e.g., from a "bottom-dead-center" position to a "top-dead-center" position) compresses the air. Fuel is injected near the "top-dead-center" position in order to initiate the combustion process. The movement of the piston 100 is transferred to a crankshaft in a crankcase 22 of the engine 10 via a connecting rod 24. As shown in FIG. 1, the connecting rod 24 is coupled to the piston 100 and rotates relative to the piston 100 via wrist pin 26. In the example embodiment of FIG. 1, the crankcase 22 is at least partially filled with engine oil. The engine oil provides lubrication to moving components and cools the engine during operation. Oil may be provided to the piston 100 using a piston cooling nozzle that receives pressurized oil from a lubrication pump. The oil is targeted by the nozzle to spray into an oil cooling gallery disposed within the piston 100. The oil moves through the cooling gallery to reduce the temperature of the piston 100 before passing back into the crankcase 22. Pumping the oil through the small passages of the cooling gallery reduces the overall lubrication pumping capacity needed to inject oil into the pistons 100 (e.g., into other parts of the piston 100 such as the skirt, etc.).

Figure 2:
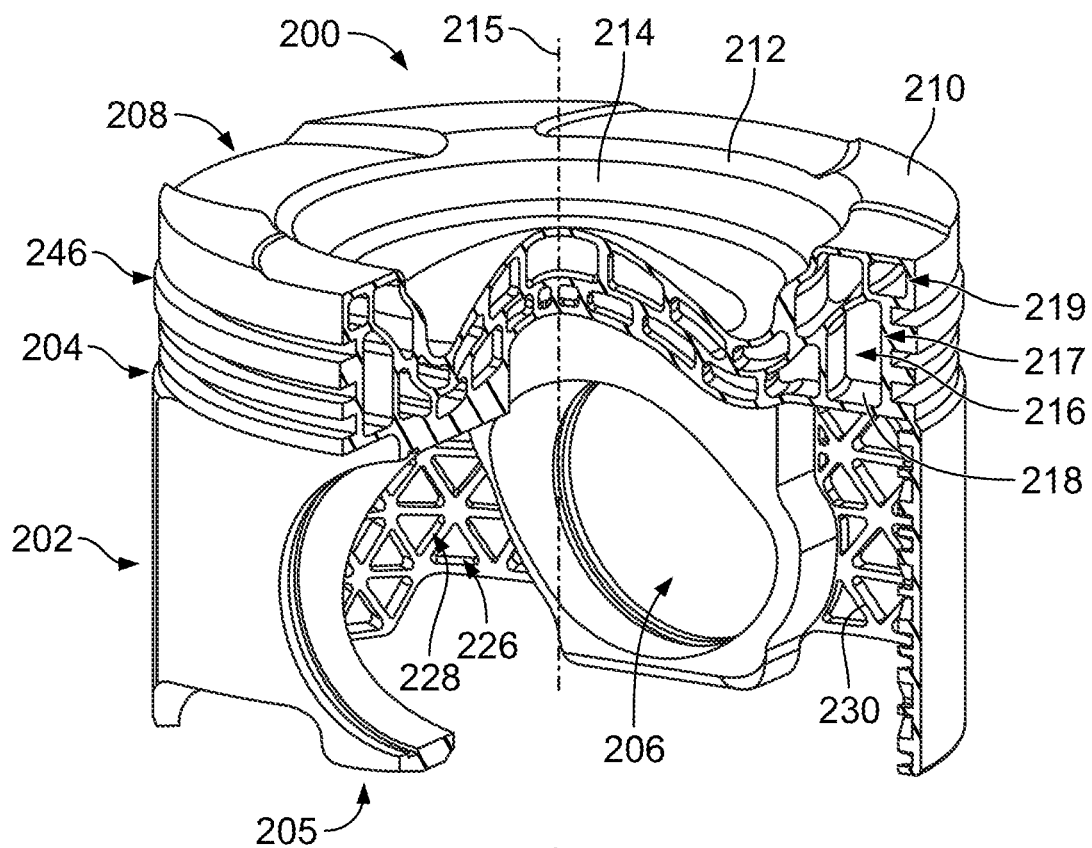
FIG. 2 is a sectional view of an example piston including a skirt and a crown.

FIG. 2 depicts an example piston 200 that may also be used in the engine 10 (e.g., as an alternative to piston 100). The piston 200 includes a skirt 202 including an upper portion 204 and a lower portion 205. The lower portion 205 includes an opening 206 configured to receive a wrist pin therein. The opening 206 extends through the skirt 202 in a substantially perpendicular orientation relative to a central axis of the piston 200.

As shown in FIG. 2, the piston 200 additionally includes a crown 208 coupled to the upper portion 204 of the skirt 202. The crown 208 includes an upper face 210, a bowl rim 212, and a bowl wall 214. Together, the bowl rim 212 and the bowl wall 214 form a piston bowl. Unlike the piston 100 of FIG. 1, the piston 200 of FIG. 2 includes a plurality of air pockets 216 within the crown 208. The air pockets 216 are structured to insulate the combustion chamber and to reduce the overall heat transfer loss through the piston 200. The air pockets 216 are disposed between an upper wall 218 of the skirt 202 and the bowl wall 214 and/or upper face 210. The air pockets 216 are distributed within the crown 208 in rows such that there is at least one air pocket 216 along an axial direction (e.g., parallel to a central axis 215 of the piston 200 and/or skirt 202) through the crown 208.

Figure 3:
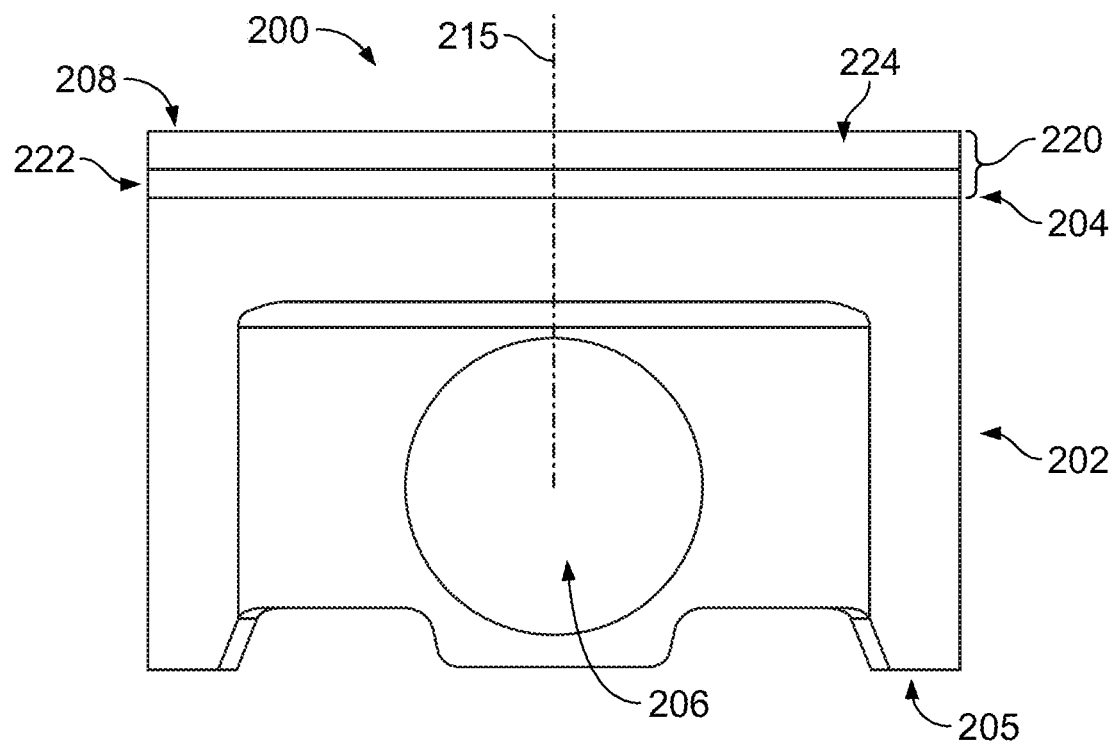
FIG. 3 is a side view of the piston of FIG. 2 before a machining operation.

FIG. 3 depicts the piston 200 prior to a sintering operation used to couple the crown 208 to the skirt 202. As shown in FIG. 3, the crown 208 includes a plurality of sections 220, including a middle section 222 and a top section 224. In other example embodiments, additional or fewer sections 220 may be included. As used herein, references to the sections 220 should be understood as including the middle section 222 and the top section 224 unless otherwise noted. The number of sections 220 is approximately equal to the number of air pockets 216 along the axial direction. In the example embodiment of FIG. 3, the sections 220 are generally horizontal slices of the crown 208. A height of each of the sections 220 in the axial direction along the piston 200 may be approximately equal. An outer diameter of each one of the sections 220 is approximately equal to an outer diameter of the skirt 202.

As shown in FIG. 3, the sections 220 are stacked vertically in an axial direction (e.g., vertically up and down as shown in FIG. 3) along the piston 200. The middle section 222 of the crown 208 is "sandwiched" or otherwise disposed between the top section 224 and the upper portion 204 (e.g., upper wall 218 as shown in FIG. 2) of the skirt 202. According to an example embodiment, each one of the sections 220 is formed in isolation (e.g., separately, individually, etc.) from the skirt 202 and also from the other sections 220. The sections 220 are each formed using a binder jet manufacturing process in which a liquid binding agent is selectively deposited to join metal particles (e.g., a metal powder such as aluminum or cast iron, etc.). Among other benefits, the binder jet process does not require heat during the forming process, which prevents residual stresses in the parts. Additionally, parts are supported throughout the manufacturing process by surrounding metal powder in the job box, thereby eliminating the need for a support structure during manufacturing.

FIGS. 4-6 depict the skirt 202 of the piston 200. The skirt 202 is generally cylindrically-shaped. As shown in FIG. 4, the lower portion 205 of the skirt 202 is a generally cylindrical tube extending downwardly (e.g., vertically up and down as shown in FIG. 4) from the upper portion 204. The piston 200 includes an opening 206 extending through the lower portion 205, through opposing walls of the lower portion 205, in a perpendicular orientation relative to the central axis. The opening 206 defines a pin boss configured to receive a wrist pin therein (see also FIG. 1). As shown in FIG. 6, an interior surface 226 of the lower portion 205 includes an isogrid structure, shown as first skirt isogrid 228. As shown in FIG. 2, the first skirt isogrid 228 is a partially hollowed-out patterned structure defined by a plurality of ribs 230 extending radially inward toward the central axis of the piston 200. A thickness of the ribs 230 and/or spacing of the ribs 230 depends on the application and the materials used for the piston 200. According to an example embodiment, the thickness of the ribs 230 is approximately 1.5 mm.

The ribs 230 define a generally triangular-shaped grid pattern. In other example embodiments, the arrangement of ribs 230 may be different. For example, the ribs 230 may define a rectangular-shaped grid pattern, or another suitable shape. In yet other example embodiments, the pattern may be non-uniform with ribs 230 spaced at different intervals along the interior surface 226 of the lower portion 205. Among other benefits, the ribs 230 help strengthen the skirt 202 while minimizing the overall mass of the piston 200.

FIG. 5 depicts the upper portion 204 of the skirt 202. The upper portion 204 includes an upper wall 218 that extends across the lower portion 205 at a first end of the lower portion 205 such that it covers the first end. As shown in FIG. 5, the upper wall 218 includes an isogrid structure, shown as second skirt isogrid 232. The second skirt isogrid 232 may be the same or similar to the first skirt isogrid 228 described with reference to FIGS. 2 and 6. In the example embodiment of FIG. 5, the second skirt isogrid 232 includes a plurality of ribs 234 defining a generally rectangular-shaped pattern (e.g., a bullseye-shaped pattern, etc.) along the upper wall 218. The ribs 234 define a plurality of recessed areas 236. Together with the middle section 222 (see also FIGS. 7-9), the recessed areas 236 define a first plurality of air pockets 217 in the crown 208.

In the example embodiment of FIGS. 4-6, the skirt 202 is produced in isolation from the crown 208 (e.g., separately from the sections 220) using a binder jet manufacturing process. It will be appreciated that the size of the skirt 202 and other parts of the piston 200 may be different in various alternative embodiments. Among other factors, the size of the piston 200 will depend on engine displacement, the cylinder compression height, and the like.

Figure 7:
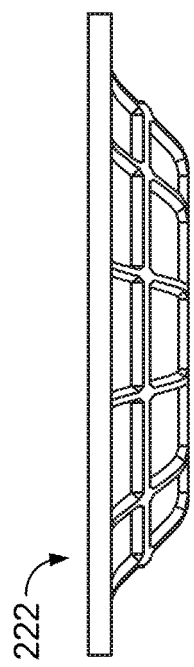
FIG. 7 is a side view of a lower section of the crown of FIG. 2.
Figure 9:
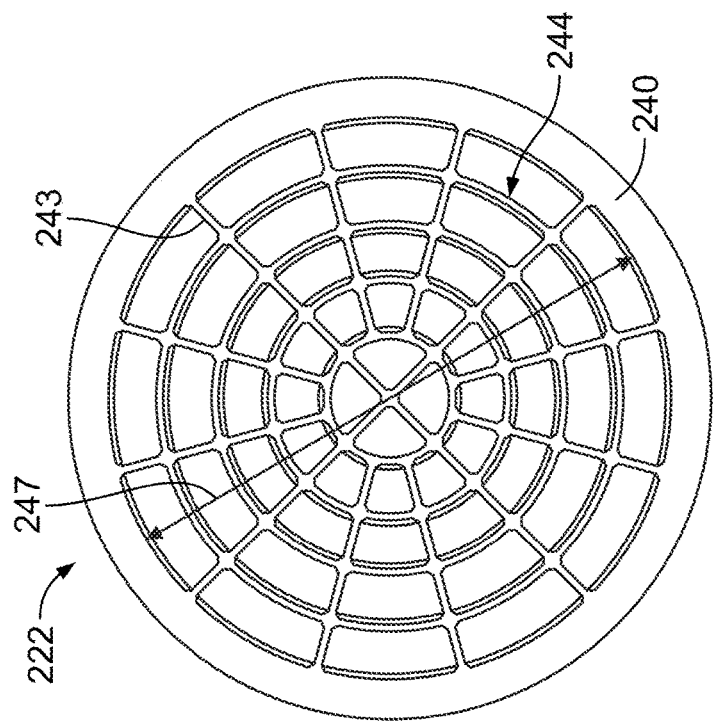
FIG. 9 is a bottom view of the lower section of FIG. 7.
Figure 8:
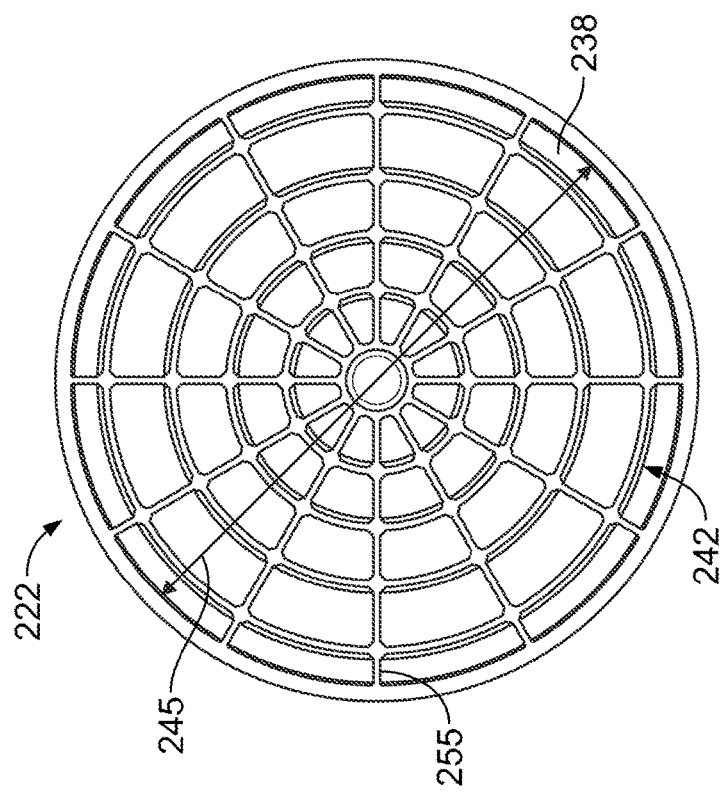
FIG. 8 is a top view of the lower section of FIG. 7.

FIGS. 7-9 depict the middle section 222 of the crown 208. The middle section 222 is generally bowl-shaped such that it matches the contours of the bowl wall 214 (see also FIG. 2). As shown in FIGS. 8-9, both an upper surface 238 of the middle section and a lower surface 240 of the middle section 222 include an isogrid structure, shown as middle upper isogrid 242 and middle lower isogrid 244, respectively. The middle lower isogrid 244 may be the same or similar to the second skirt isogrid 232 described with reference to FIG. 5. The ribs 243 defining the middle lower isogrid 244 are alignable with the ribs 234 on the upper wall 218 of the skirt 202 (see FIG. 5). Together, the middle lower isogrid 244 and the second skirt isogrid 232 form a first plurality of air pockets 217 in the crown 208 (see also FIG. 2). Among other benefits, including an isogrid structure on both the upper wall 218 of the skirt 202 and the lower surface 240 of the middle section 222 minimizes the required wall thickness of the ribs. In other example embodiments, an isogrid structure may be formed on only one of the upper wall 218 and the middle section 222.

As shown in FIGS. 8-9, the middle upper isogrid 242 is substantially similar to the middle lower isogrid 244. An outer diameter 245 of the middle upper isogrid 242 is greater than an outer diameter 247 of the middle lower isogrid 244. Among other benefits, this difference in diameter allows an additional air pocket to be positioned between the upper face 210 of the crown 208 and an uppermost ring groove 246 (see FIG. 2) of the piston rings. The additional air pocket helps minimize heat transfer loss to the uppermost ring groove 246, which can, advantageously, minimize distortion of the uppermost ring groove 246 and other ring grooves during operation.

Figure 10:
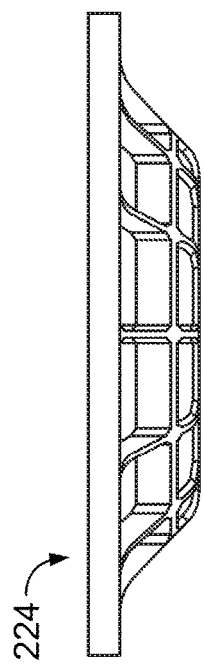
FIG. 10 is a side view of an upper section of the crown of FIG. 2.
Figure 12:
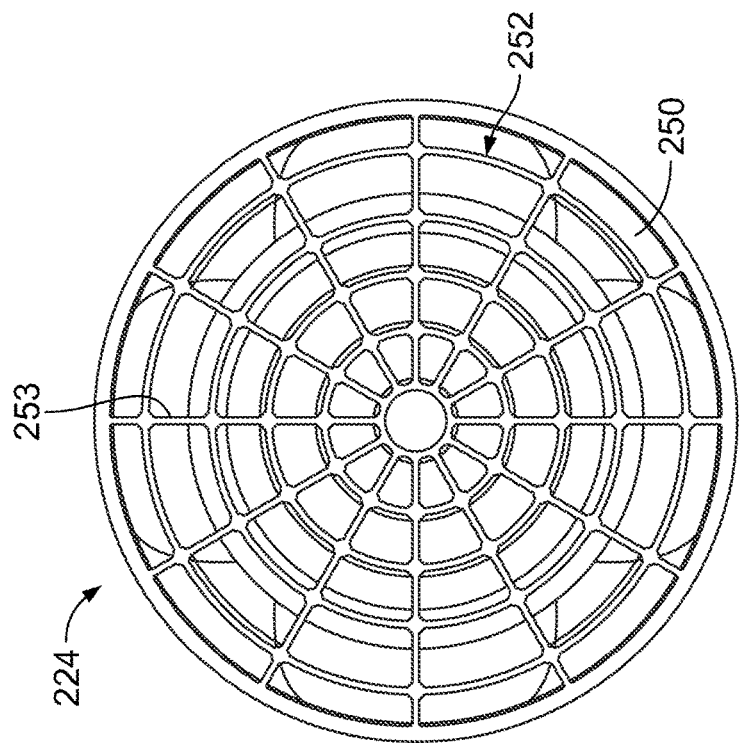
FIG. 12 is a bottom view of the upper section of FIG. 10.
Figure 11:
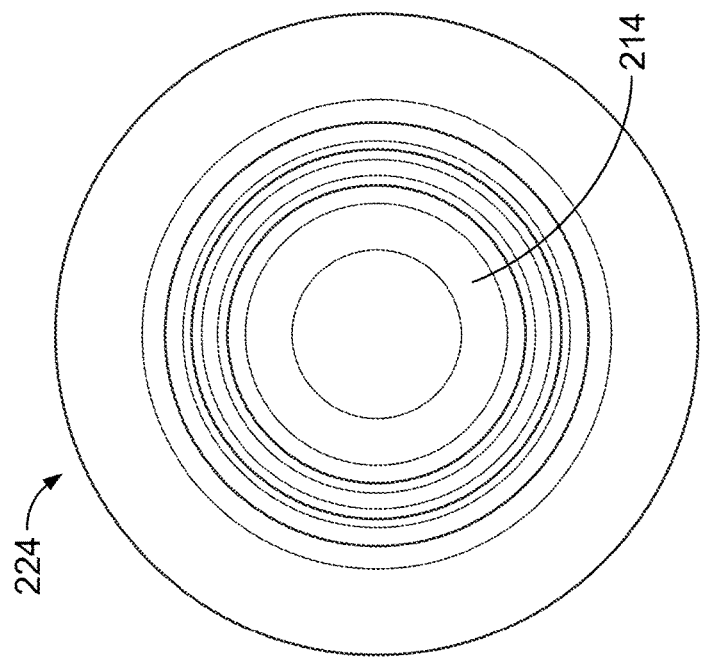
FIG. 11 is a top view of the upper section of FIG. 10.

FIGS. 10-12 depict the top section 224 of the crown 208. Similar to the middle section 222, the top section 224 is generally bowl-shaped. An upper surface 248 of the top section 224 defines the bowl wall 214. A lower surface 250 of the top section 224 includes an isogrid structure, shown as top lower isogrid 252. As shown in FIG. 12, the top lower isogrid 252 is substantially similar to the middle upper isogrid 242 (see also FIG. 8). The ribs 253 defining the top lower isogrid 252 are alignable with the ribs 255 defining the middle upper isogrid 242 of the middle section 222. Together, the top lower isogrid 252 and the middle upper isogrid 242 form a second plurality of air pockets 219 in the crown 208 (see also FIG. 2).

Figure 13:
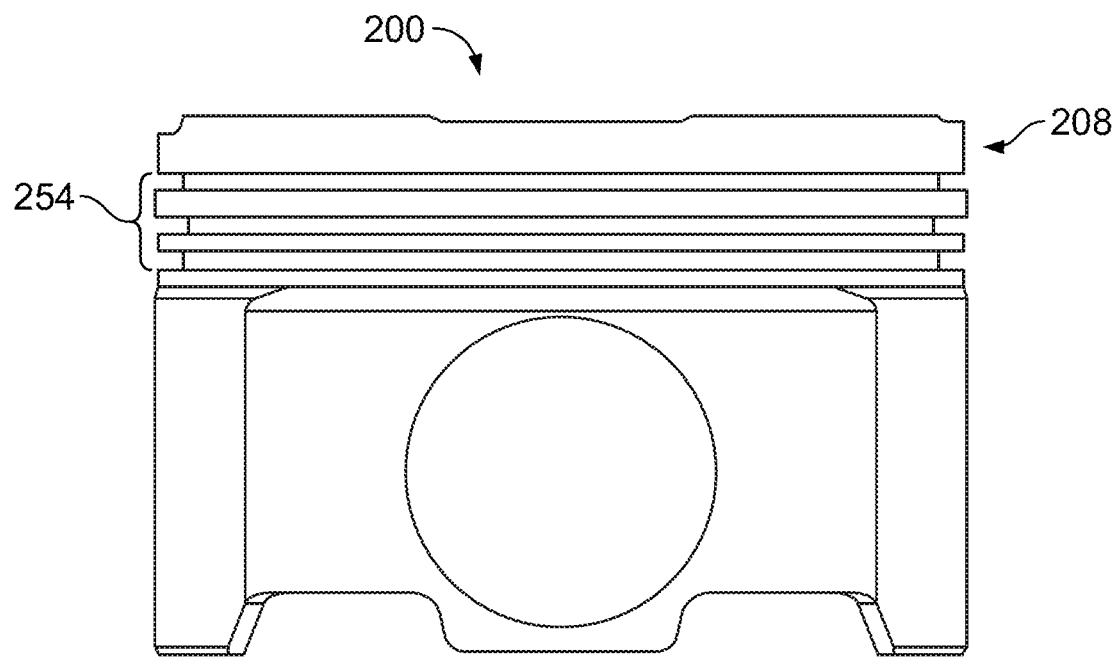
FIG. 13 is a side view of the piston of FIG. 2.
Figure 14:
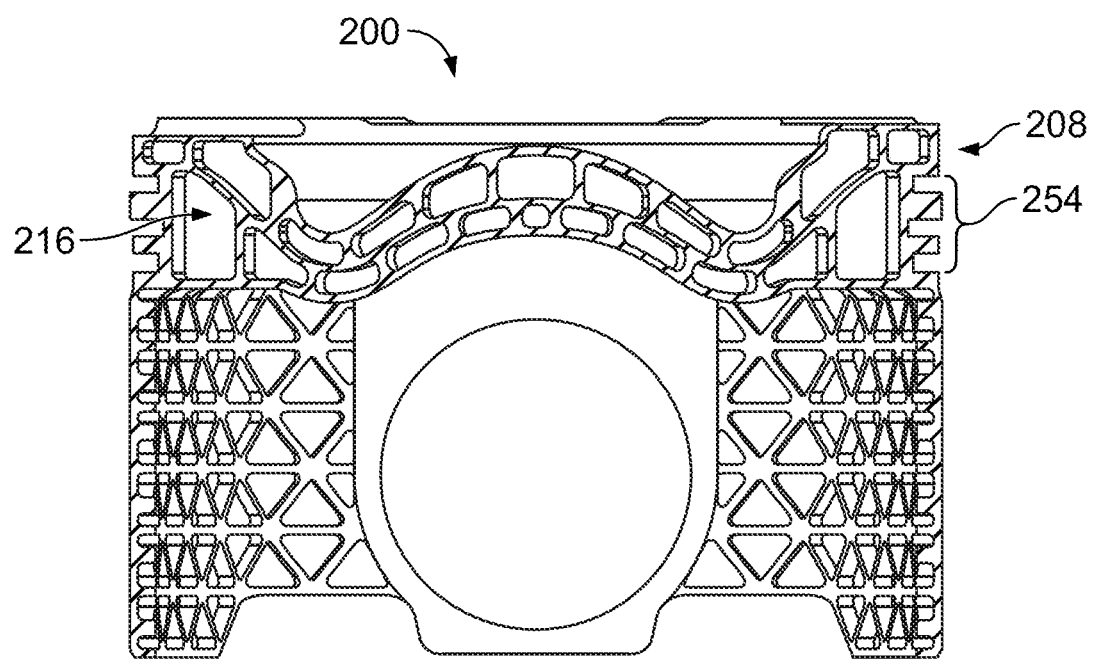
FIG. 14 is another sectional view of the piston of FIG. 2.

Referring now to FIG. 3, the crown 208 is coupled to the 204 upper portion of the skirt 202 via a sintering operation. The sintering operation joins the ribs between adjacent sections 220 of the crown 208, and also between ribs of the crown 208 and the upper wall 218 of the skirt 202 (see also FIG. 2). FIGS. 13-14 depict the piston 200 after the sintering operation is complete. As shown in FIG. 13, a plurality of ring grooves 254 may be machined or otherwise formed into the piston 200 after the sintering operation. The ring grooves 254 extend circumferentially around the crown 208 and are configured to receive a piston rings therein. In other example embodiments, additional machining and/or secondary operations may be performed.

As shown in FIG. 14, the crown 208 includes at least one row of air pockets 216 forming an air gap. It will be appreciated that more or fewer rows may be formed within the crown 208 by increasing the number of sections used in the crown 208, with the number of rows approximately equal to the number of sections. The geometry of each air pocket 216 may also be modified in various example embodiments. For example, the cross-sectional geometry of each air pocket 216 may be modified by changing the isogrid pattern used on adjacent sections of the crown 208.

Figure 15:
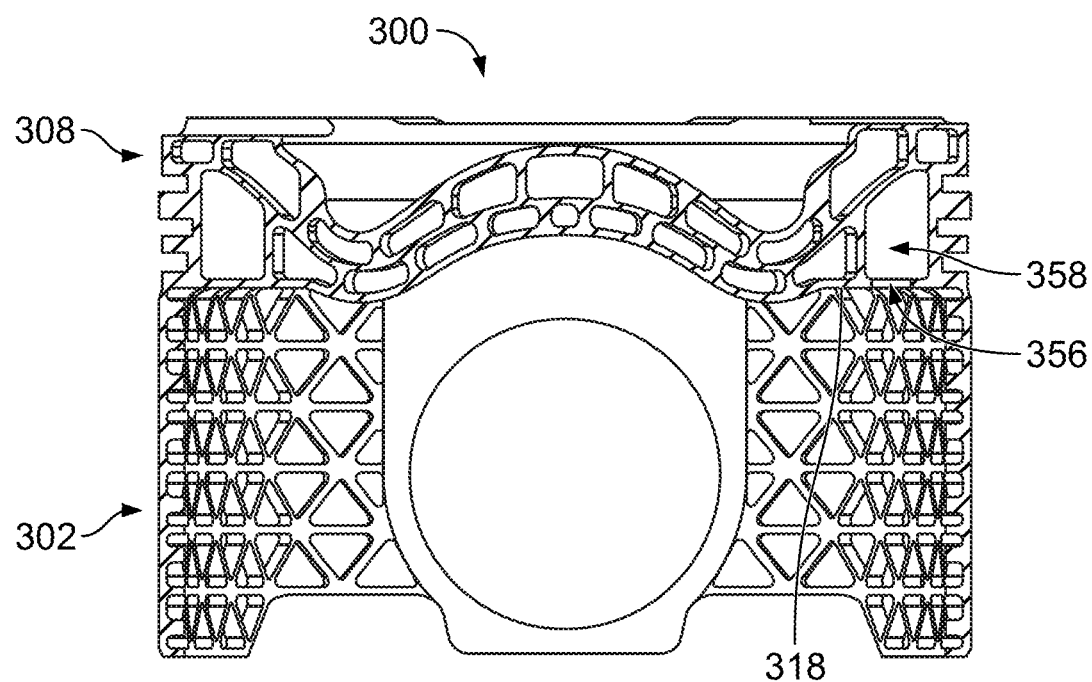
FIG. 15 is a sectional view of another example piston.
Figure 16:
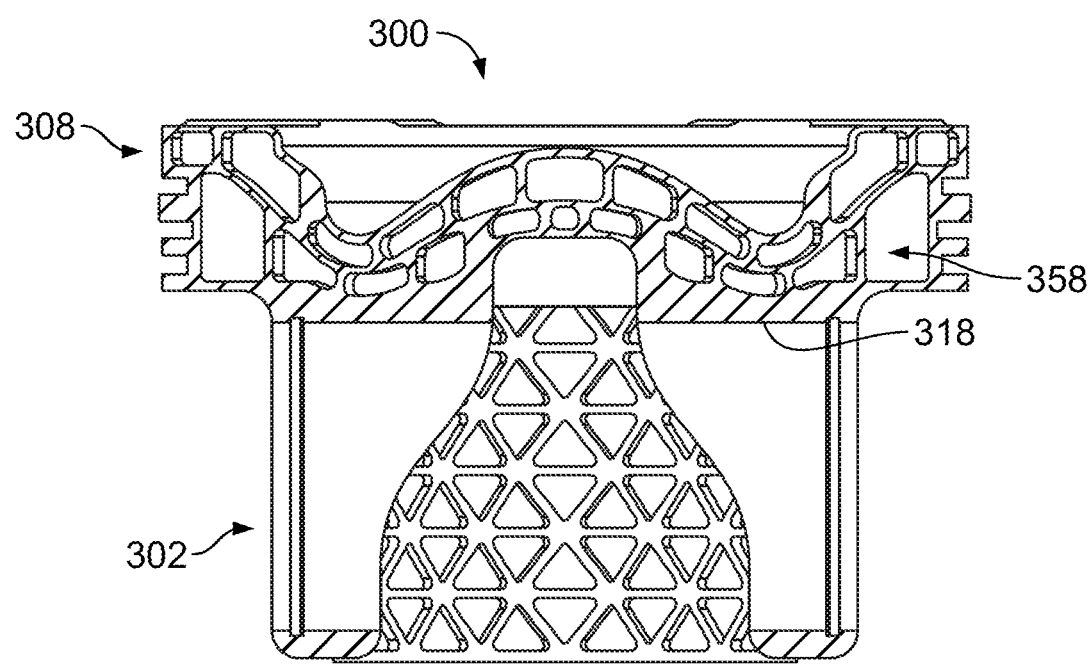
FIG. 16 is a sectional view of the piston of FIG. 15.

FIGS. 15-16 depict cross-sectional views of another example piston 300. The piston 300 includes a skirt 302 and a crown 308. As shown in FIGS. 15-16, the crown 308 is substantially similar to the crown 208 of FIGS. 2-6. For convenience, similar item numbering will be used to identify similar components. As shown in FIGS. 15-16, the piston 300 (e.g., skirt 302) includes an oil port 356 structured to fluidly couple an outer air pocket 358 of the crown 308 with the crankcase (e.g., crankcase 22 of FIG. 1). In the example embodiment of FIGS. 15-16, the oil port 356 is disposed in an upper wall 318 of the skirt 302. The oil port 356 is a circular hole extending through the upper wall 318. In other example embodiments, the oil port 356 is at least partially disposed in the crown 308 (e.g., in at least one section of the crown 308, etc.). The number and/or geometry of the oil port(s) 356 may differ in various example embodiments. In the example embodiment of FIGS. 15-16, the outer air pocket 358 extends circumferentially along a perimeter of the upper wall 318 such that oil may flow freely along the perimeter of the piston 300. In this way, the outer air pocket 358 forms an oil gallery for the piston 300.

According to an example embodiment, at least one of the skirt 302 or the crown 308 include ribs that extend into the outer air pocket 358 (e.g., into the oil gallery formed by the outer air pocket 358). The ribs may at least partially restrict the flow through the outer air pocket 358, which can, advantageously, increase the overall heat transfer between the oil and the piston 300. For example, in the crown 208 shown in FIG. 9, the ribs 243 of the middle lower isogrid 244 may have a reduced height in the area of the outer air pocket 358 such that oil can move past the ribs 243 and along the perimeter of the crown 208. The shape, number, and arrangement of ribs (as well as the number, shape, and arrangement of oil ports 356 along the skirt 302) may be modified to optimize heat transfer while minimizing the overall pressure drop through the outer air pocket 358. In some embodiments, additional air pockets may also be utilized as oil galleries for the piston 300.

I. EXAMPLE MANUFACTURING METHOD FOR THE EXAMPLE PISTON

Figure 17:
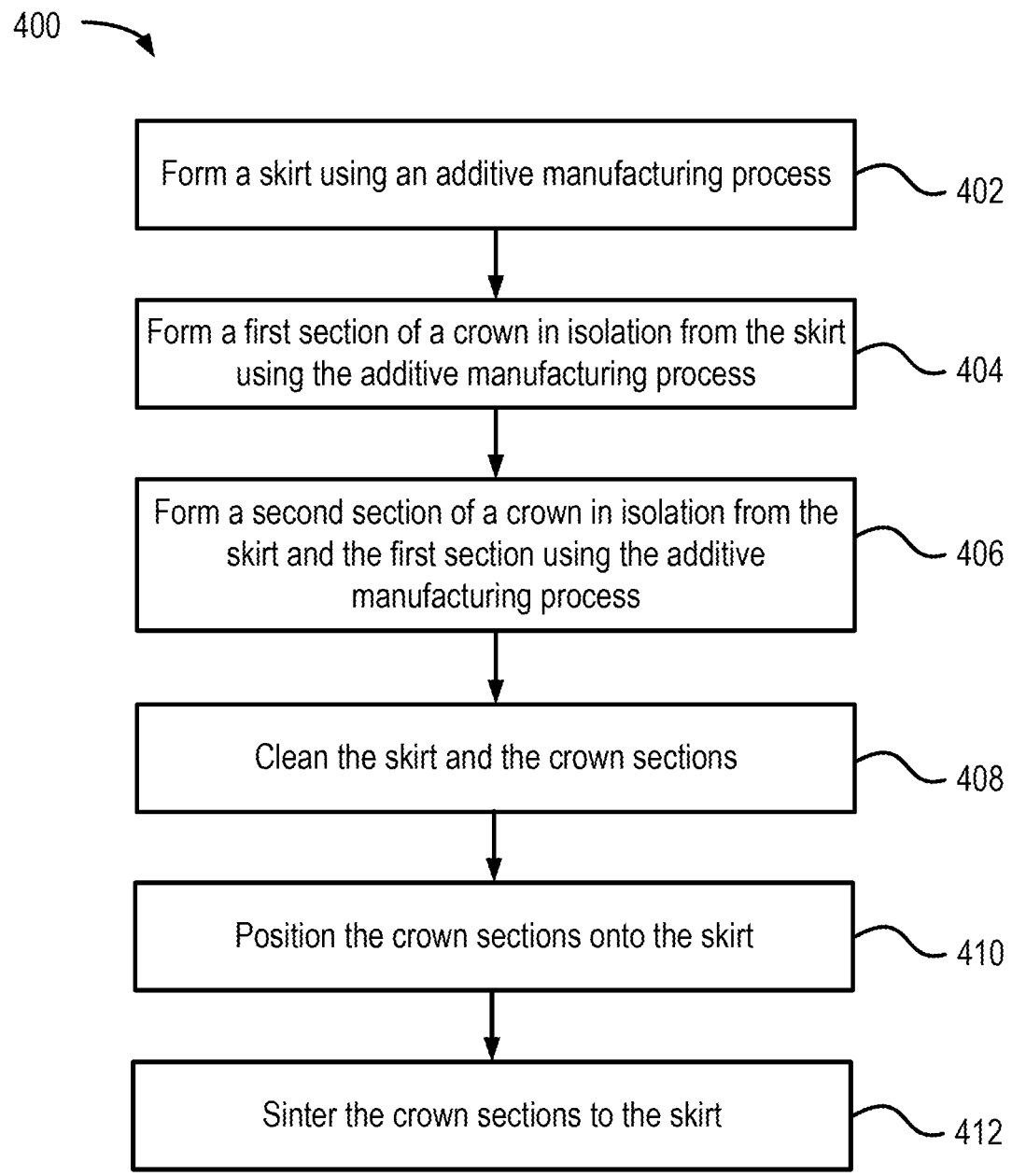
FIG. 17 is a block diagram of an example manufacturing process for a piston.

FIG. 17 depicts a method 400 of manufacturing an example piston. The piston may be the same or similar to the piston 200 of FIGS. 2-12 (or, alternatively, the piston 300 of FIGS. 15-16). At 402, a skirt 202 is formed. The skirt 202 may be formed using an additive manufacturing process. For example, the skirt 202 may be formed using a binder jet manufacturing process. Block 402 may additionally include preparing a binder jet system by providing a model (e.g., a computer aided design ("CAD") model) to the system and supplying a metal powder to the binder jet system (e.g., pouring a metal powder into a job box of the binder jet system). Block 402 may further include applying, by a nozzle of the binder jet system, an adhesive, flux, or other suitable binding agent to the metal powder in the job box to form a first part layer. This process may be repeated until the skirt 302 is fully formed. In some example embodiments, block 402 further includes varying the particle size or density of the metal powder in different layers. Among other benefits, varying the density of the part during the forming process helps minimize part mass. Varying the density in a forming direction may also facilitate bonding between the sections 220 and the skirt 202.

At 404, a first section of the crown 308 is formed. The first section of the crown 308 may be, for example, the middle section 222 or the top section 224 of the piston 200 of FIGS. 2-14. Block 404 may proceed in a similar manner as block 402 until the first section is fully formed within the job box. At 406, a second section of the crown 308 is formed. According to an example embodiment, blocks 402, 404, and 406 are performed simultaneously. Blocks 402, 404, 406 may be performed using the same binder jet system, with each component formed in separate areas (e.g., regions, etc.) of the job box such that each component is formed in isolation (e.g., separately, individually, etc.) from other components.

At 408, the skirt 302 and crown sections 220 are cleaned. Block 408 includes removing the skirt 302 and the sections 220 from the job box. Block 408 additionally includes removing metal powder from the recessed areas of each component including a hollow portion of the skirt 202, the opening 206, and isogrids. Excess metal powder may be removed using compressed air, a brush, or another suitable cleaning apparatus. Block 408 may additionally include trimming operations to remove flash and/or other excess material from the piston 200. Block 408 may further include a curing operation to harden the binding agent or to otherwise strengthen each component in preparation for subsequent operations.

At 410, the sections 220 are positioned with respect to the skirt 202. Block 410 may additionally include aligning the sections 220. For example, the middle section 222 may be aligned with respect to the skirt 202 such that it is concentric with the skirt 202 (e.g., a central axis of the middle section 222 may be aligned with a central axis of the skirt 202). The top section 224 of the crown 208 may be aligned with the middle section 222. In an example embodiment, a rib on at least one of the sections 220 includes a small extension or tongue. The tongue is alignable with a groove on a corresponding one of the ribs on a second section 220 or on the skirt 202. The tongue is structured to interface with the groove to facilitate alignment between the sections 220 or between one of the sections 220 and the skirt 202. In other example embodiments, a different alignment feature between sections 220 may be utilized.

Block 410 may additionally include applying a layer of flux, adhesive, or another binding agent to the ribs to facilitate coupling between sections 220 and to maintain alignment between the sections 220 once positioned relative to each other. The binding agent may be applied via spraying, painting, or another suitable application method.

At 412, the sections 220 are sintered to the skirt 202 to form a single unitary structure (e.g., a single unitary body, etc.). Block 412 may include placing the assembled piston 200 into a furnace, oven, or the like. The sintering process may also be completed in the presence of an inert gas or vacuum environment in order to create vacuum or inert gas pockets within the piston 200, which can reduce the overall heat transfer resistance through the piston 200 relative to air. Block 412 may additionally include positioning the piston 200 on a scaffold or other support structure in order to maintain alignment between the sections 200 and the skirt 202 throughout the sintering process. Block 412 may further include setting a temperature of the furnace or oven. Once the sintering process is complete, the piston 200 may be removed from the furnace or oven. At this point, machining operations and/or other secondary operations may be performed. For example, the ring grooves may be machined onto an outer surface of the piston 200. In other example embodiments, the method 400 may include additional, fewer, and/or different operations.

IV. CONSTRUCTION OF EXAMPLE EMBODIMENTS

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "approximately," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language a "portion" is used, the item can include a portion and/or the entire item unless specifically stated to the contrary.

What is claimed is:

1. A piston, comprising:
a skirt; and
a crown sintered to the skirt, the crown produced in isolation from the skirt using an additive manufacturing process, the piston including a first air gap between the crown and the skirt.

2. The piston of claim 1, wherein at least one of the crown and the skirt comprises a recessed area, the recessed area disposed between the skirt and the crown so as to form the first air gap.

3. The piston of claim 1, wherein the crown comprises a plurality of sections produced in isolation from the skirt using the additive manufacturing process, the crown including a second air gap disposed between two of the plurality of sections such that the piston includes a plurality of air gaps.

4. The piston of claim 3, wherein each one of the plurality of air gaps comprises a plurality of air pockets distributed in a row between either (i) two sections of the plurality of sections; or (ii) the crown and the skirt, and wherein a total number of air gaps is equal to a total number of sections.

5. The piston of claim 1, wherein the skirt comprises an upper portion and a lower portion extending downwardly from the upper portion, the lower portion defining a cylindrical tube, wherein the upper portion includes an upper wall that extends across a first end of the cylindrical tube and covers the first end, and wherein the crown is coupled to the upper wall.

6. The piston of claim 1, wherein at least one of the crown or the skirt comprises an isogrid, the isogrid comprising a plurality of ribs defining a plurality of recessed areas, the plurality of recessed areas forming a portion of the first air gap.

7. The piston of claim 6, wherein the crown comprises a plurality of sections including a middle section, wherein the middle section includes a middle upper isogrid disposed on an upper surface of the middle section and a middle lower isogrid disposed on a lower surface of the middle section, and wherein an outer diameter of the middle upper isogrid is greater than an outer diameter of the middle lower isogrid.

8. The piston of claim 1, wherein at least one of the crown or the skirt includes an oil port that fluidly couples the first air gap to a lower portion of the skirt.

9. An internal combustion engine, comprising:
a cylinder block defining a cavity;
a cylinder head coupled to an upper end of the cylinder block and covering the cavity;
a piston at least partially disposed within the cavity, the piston comprising:
a skirt; and
a crown sintered to the skirt, the crown produced in isolation from the skirt using an additive manufacturing process, the piston including a first air gap between the crown and the skirt.

10. The internal combustion engine of claim 9, wherein at least one of the skirt or the crown comprises a recessed area, and wherein the recessed area is disposed between the skirt and the crown so as to form the first air gap.

11. The internal combustion engine of claim 9, wherein the crown comprises a plurality of sections produced in isolation from the skirt using the additive manufacturing process, the crown including a second air gap disposed between two of the plurality of sections such that the piston includes a plurality of air gaps.

12. The internal combustion engine of claim 9, wherein the skirt comprises an upper portion and a lower portion extending downwardly from the upper portion, wherein the lower portion defines a cylindrical tube, wherein the upper portion includes an upper wall that extends across a first end of the cylindrical tube and covers the first end, and wherein the crown is coupled to the upper wall.

13. The internal combustion engine of claim 9, wherein at least one of the crown or the skirt comprises an isogrid, wherein the isogrid comprises a plurality of ribs defining a plurality of recessed areas, and wherein the plurality of recessed areas form a portion of the first air gap.

14. The internal combustion engine of claim 9, further comprising a crankcase coupled to the cylinder block, wherein the piston includes an oil port that fluidly couples the first air gap to the crankcase.

15. A method, comprising:
forming a skirt using an additive manufacturing process;
forming a crown in isolation from the skirt using the additive manufacturing process, at least one of the skirt or the crown comprising a recessed area;
positioning crown onto the skirt such that the recessed area is disposed therebetween; and
sintering the crown to the skirt.

16. The method of claim 15, wherein the recessed area is one of a plurality of recessed areas, and wherein at least one of the skirt or the crown comprises a plurality of ribs defining the plurality of recessed areas.

17. The method of claim 15, wherein forming the crown comprises forming a first section using the additive manufacturing process, and forming a second section in isolation from the first section using the additive manufacturing process.

18. The method of claim 17, further comprising:
positioning the first section onto the skirt;
positioning the second section onto the first section; and
joining both the first section and the second section to the skirt.

* * * * *